United States Patent
Li et al.

(10) Patent No.: US 12,442,781 B2
(45) Date of Patent: Oct. 14, 2025

(54) BULK MATERIAL FOREIGN OBJECT DETECTION METHOD, DEVICE AND X-RAY FOREIGN OBJECT DETECTION EQUIPMENT

(71) Applicant: Shanghai Vixdetect Inspection Equipment Co., Ltd., Shanghai (CN)

(72) Inventors: Yuanyi Li, Shanghai (CN); Jingjing Wang, Shanghai (CN)

(73) Assignee: Shanghai Vixdetect Inspection Equipment Co., Ltd., Shanghai (CN)

( * ) Notice: Subject to any disclaimer, the term of this patent is extended or adjusted under 35 U.S.C. 154(b) by 0 days.

(21) Appl. No.: 18/993,767

(22) PCT Filed: Jul. 14, 2023

(86) PCT No.: PCT/CN2023/107396
§ 371 (c)(1),
(2) Date: Jan. 13, 2025

(87) PCT Pub. No.: WO2024/041263
PCT Pub. Date: Feb. 29, 2024

(65) Prior Publication Data
US 2025/0264421 A1 Aug. 21, 2025

(30) Foreign Application Priority Data

Aug. 23, 2022 (CN) .......................... 202222221652.0
Nov. 30, 2022 (CN) .......................... 202211518267.0

(51) Int. Cl.
*G01N 23/18* (2018.01)
*B08B 1/30* (2024.01)
(Continued)

(52) U.S. Cl.
CPC .............. *G01N 23/18* (2013.01); *B08B 1/30* (2024.01); *B08B 5/023* (2013.01); *B08B 13/00* (2013.01);
(Continued)

(58) Field of Classification Search
CPC ...... G01N 23/18; G01N 23/04; G01N 23/083; G01N 2223/401; G01N 2223/652;
(Continued)

(56) References Cited

U.S. PATENT DOCUMENTS

| | | | |
|---|---|---|---|
| 12,292,392 B2 * | 5/2025 | Sugimoto | G01N 23/083 |
| 2019/0297717 A1 * | 9/2019 | Kondo | G01N 23/04 |
| 2020/0041423 A1 * | 2/2020 | Sugimoto | G01N 23/04 |

FOREIGN PATENT DOCUMENTS

| | | |
|---|---|---|
| CN | 104085667 A | 10/2014 |
| CN | 205904131 U | 1/2017 |

(Continued)

*Primary Examiner* — Tom Y Lu
(74) *Attorney, Agent, or Firm* — Woodard, Emhardt, Henry, Reeves & Wagner, LLP

(57) ABSTRACT

The present application discloses a bulk material foreign object detection method, device and X-ray foreign object detection equipment. The method is applicable to the X-ray foreign object detection equipment with a bulk material foreign object detection device, a flap removal device and a blowing removal device, comprising: acquiring an X-ray image of the bulk material under detection; analyzing the X-ray image, and determining the quantity, position, size and density of foreign objects in the bulk material; when the quantity of foreign objects exceeds a preset quantity threshold, or size, density and position relationship are not suitable for blowing removal, they are removed by the flap removal device; when they are suitable for blowing removal, based on their positions, they are removed by corresponding (Continued)

nozzles of the blowing removal device. Accurate and complete removal of foreign objects is achieved.

20 Claims, 6 Drawing Sheets

(51) Int. Cl.
| | | |
|---|---|---|
| *B08B 5/02* | (2006.01) | |
| *B08B 13/00* | (2006.01) | |
| *G01N 23/04* | (2018.01) | |
| *G01N 23/083* | (2018.01) | |
| *G06T 7/00* | (2017.01) | |
| *G06T 7/60* | (2017.01) | |
| *G06T 7/70* | (2017.01) | |
| *G06V 10/34* | (2022.01) | |

(52) U.S. Cl.
CPC .......... *G01N 23/04* (2013.01); *G01N 23/083* (2013.01); *G06T 7/0004* (2013.01); *G06T 7/60* (2013.01); *G06T 7/70* (2017.01); *G06V 10/34* (2022.01); *G01N 2223/401* (2013.01); *G01N 2223/652* (2013.01); *G06T 2207/10116* (2013.01); *G06T 2207/30108* (2013.01); *G06T 2207/30242* (2013.01); *G06V 2201/05* (2022.01); *G06V 2201/07* (2022.01)

(58) Field of Classification Search
CPC .......... B08B 1/30; B08B 5/023; B08B 13/00; G06T 7/0004; G06T 7/60; G06T 7/70; G06T 2207/10116; G06T 2207/30108; G06T 2207/30242; G06V 10/34; G06V 2201/05; G06V 2201/07
See application file for complete search history.

(56) References Cited

FOREIGN PATENT DOCUMENTS

| | | | |
|---|---|---|---|
| CN | 114170181 A | 3/2022 | |
| CN | 218133403 U | 12/2022 | |
| CN | 115889247 A | 4/2023 | |
| JP | 2006061767 A | 3/2006 | |
| JP | 2018187600 A | 11/2018 | |
| JP | 2021016815 | * 2/2021 | ............. B07C 5/342 |

* cited by examiner

BULK MATERIAL FOREIGN OBJECT DETECTION METHOD, DEVICE AND X-RAY FOREIGN OBJECT DETECTION EQUIPMENT

FIELD OF THE DISCLOSURE

The present application relates to a field of foreign object detection, and in particular to a bulk material foreign object detection method, device and X-ray foreign object detection equipment.

BACKGROUND

At present, X-ray technology is widely used in the field of online inspection of industrial production lines. Through X-ray transmission images, the internal structure and state of products can be clearly seen, and possible foreign objects or product defects can be detected. Taking a food production line as an example, when bagged or bulk food is mixed with metal, ceramic pieces, glass pieces or stones, etc., it can be imaged via X-ray scanning, and then an image processing program analyzes the image. When foreign objects are detected, the equipment can automatically remove the products containing foreign objects.

For bagged products, the removal device can use swing arms or flaps to remove the whole package. For bulk granular products, the removal device generally uses a blowing method. A blowing removal device is a row of nozzles installed at the outlet of a conveyor belt. When foreign objects move to the position of the nozzles along the conveyor belt, if the solenoid valves do not work, the bulk material falls freely forward and downward due to gravity and inertia and falls into a good product collection device; if the solenoid valves work, high-pressure gas is blown, and the bulk material changes its falling trajectory due to the gas pressure and falls into a foreign object collection device.

However, there are certain shortcomings with blowing removal. To remove foreign objects, a blowing process needs to blow high-pressure gas. The fewer blowing nozzles are operating at the same time, the higher the pressure of the gas blown. On the contrary, if multiple nozzles are operating at the same time, the pressure of the gas blown will become lower. In such cases, a problem will arise. When the pressure of the gas blown is too low, the falling trajectory of the bulk material cannot be changed, and foreign objects may not be removed successfully.

To ensure that the gas blowing can successfully remove foreign objects, we usually open multiple adjacent nozzles and blow high-pressure gas at the same time when we find a foreign object that needs to be removed, to avoid unsuccessful removal due to position deviation. However, this results in an even smaller number of nozzles that can be opened at the same time to remove foreign objects. If multiple foreign objects are to be removed at the same time, the quantity of nozzles opened is too large and not all foreign objects can be removed.

At present, to be able to open more nozzles at the same time for blowing, the general method is to increase the capacity of the air compressor. This is relatively costly. At the same time, the use of a large-capacity air compressor will take up a larger space and consume more electricity.

SUMMARY OF THE INVENTION

To solve the above technical problems, the present application provides a bulk material foreign object detection method, device and an X-ray foreign object detection equipment.

On one hand, a bulk material foreign object detection method is provided, being applicable to an X-ray foreign object detection equipment provided with a flap removal device and a blowing removal device, and comprising: acquiring an X-ray image of bulk material under inspection via the X-ray foreign object detection equipment; analyzing the X-ray image to determine positions and a quantity of foreign objects in the bulk material; determining whether the quantity of foreign objects identified exceeds a preset quantity threshold; removing the foreign objects from the bulk material via the flap removal device when the quantity of the foreign objects exceeds the preset quantity threshold; removing the foreign objects from the bulk material via one or more corresponding nozzles of the blowing removal device according to the positions of the foreign objects when the quantity of the foreign objects does not exceed the preset quantity threshold.

In some embodiments, said "removing the foreign objects from the bulk material via one or more corresponding nozzles of the blowing removal device according to the positions of the foreign objects when the quantity of the foreign objects does not exceed the preset quantity threshold" specifically comprises: identifying and acquiring a size and a grayscale value of each foreign object in the X-ray image; determining whether there exists a target foreign object with a grayscale value greater than a first preset grayscale value; when the target foreign object exists, determining whether the grayscale value of the target foreign object is greater than a second preset grayscale value; wherein the second preset grayscale value is greater than the first preset grayscale value; when the grayscale value of the target foreign object is greater than the second preset grayscale value, removing the target foreign object via the flap removal device; when the grayscale value of the target foreign object is not greater than the second preset grayscale value, determining whether the size of the target foreign object exceeds a preset size; when the size of the target foreign object exceeds the preset size, removing the target foreign object via the flap removal device; when the size of the target foreign object does not exceed the preset size, removing the target foreign object via the blowing removal device.

In some embodiments, said "removing the foreign objects from the bulk material via one or more corresponding nozzles of the blowing removal device according to the positions of the foreign objects when the quantity of the foreign objects does not exceed the preset quantity threshold" specifically comprises: when the quantity of the foreign objects does not exceed the preset quantity threshold, further determining according to the positions of the foreign objects whether there are adjacent foreign objects with a distance smaller than a preset distance; when there are adjacent foreign objects with a distance smaller than the preset distance, removing the foreign objects via the flap removal device; when there are no adjacent foreign objects with a distance smaller than the preset distance, removing the foreign objects via one or more corresponding nozzles of the blowing removal device.

In some embodiments, the flap removal device consists of a plurality of sub-flaps, each of which is configured to be independently used under control of a control and processing module; and said "removing the foreign objects from the bulk material via the flap removal device when the quantity of the foreign objects exceeds the preset quantity threshold" specifically comprises: when the quantity of the foreign objects exceeds the preset quantity threshold, determining a target sub-flap to be used for removing the foreign objects according to positions of the foreign objects; when a foreign object reaches a removal zone of a transport channel, controlling the target sub-flap to flip, to remove the foreign object.

In some embodiments, the method further comprises: monitoring whether an adulterated product bin is filled with bulk material containing foreign objects; when the adulterated product bin is filled with bulk material containing foreign objects, returning the bulk material containing foreign objects to a feed inlet via a flowback transport channel, so that the X-ray foreign object detection equipment re-inspects the bulk material containing foreign objects.

In some embodiments, a transport speed of the flowback transport channel is smaller than a transport speed of a transport mechanism of the X-ray foreign object detection equipment, so that spacing between the bulk material containing foreign objects to be re-inspected is increased, to satisfy a preset threshold of the blowing removal device.

On another hand, a bulk material foreign object detection device is provided, being integrated into an X-ray foreign object detection equipment provided with a flap removal device and a blowing removal device, and comprising: an image acquisition module for acquiring an X-ray image of bulk material under inspection via the X-ray foreign object detection equipment; a foreign object identification module for analyzing the X-ray image to determine positions and a quantity of foreign objects in the bulk material; a quantity judgment module for determining whether the quantity of identified foreign objects exceeds a preset quantity threshold; a control and processing module for removing the foreign objects from the bulk material via the flap removal device when the quantity of the foreign objects exceeds the preset quantity threshold, and for removing the foreign objects from the bulk material via one or more corresponding nozzles of the blowing removal device according to the positions of the foreign objects when the quantity of the foreign objects does not exceed the preset quantity threshold.

In some embodiments, the device further comprises: an acquisition module for identifying a size and a grayscale value of each foreign object in the X-ray image; a grayscale judgment module for determining whether there exists a target foreign object with a grayscale value greater than a first preset grayscale value; and, when the target foreign object exists, determining whether the grayscale value of the target foreign object is greater than a second preset grayscale value, wherein the second preset grayscale value is greater than the first preset grayscale value; and wherein, the control and processing module is also used to remove the target foreign object via the flap removal device when the grayscale value of the target foreign object is greater than the second preset grayscale value; a size judgment module for determining whether the size of the target foreign object exceeds a preset size when the grayscale value of the target foreign object is not greater than the second preset grayscale value; wherein the control and processing module is also used to remove the target foreign object via the flap removal device when the size of the target foreign object exceeds the preset size; and when the size does not exceed the preset size, the target foreign object is removed via the blowing removal device.

In some embodiments, the device further comprises: a position judgment module for further determining whether there are adjacent foreign objects with a distance smaller than a preset distance according to the positions of the foreign objects after the quantity judgment module determines that the quantity of identified foreign objects does not exceed the preset quantity threshold; wherein the control and processing module is also used to remove the foreign objects via the flap removal device when adjacent foreign objects with a distance smaller than the preset distance exist; and when no adjacent foreign objects with a distance smaller than the preset distance exist, the foreign objects are removed via one or more corresponding nozzles of the blowing removal device; and the position judgment module is also used to determine a target sub-flap for removing the foreign objects when the foreign objects are to be removed via the flap removal device, and to control the target sub-flap to flip to remove the foreign objects.

On another hand, an X-ray foreign object detection equipment is provided, comprising: the bulk material foreign object detection device according to any of the above embodiments, a transport mechanism, a flap removal device, and a blowing removal device; wherein the transport mechanism is used to transport products under inspection; and the bulk material foreign object detection device is configured on the transport mechanism to inspect the products under inspection on the transport mechanism.

In some embodiments, the equipment further comprises: an adulterated product bin and an adulterated product flowback re-inspection mechanism; wherein the adulterated product flowback re-inspection mechanism is connected to the adulterated product bin and a feed inlet of the transport mechanism, and is used to re-inspect bulk material containing foreign objects in the adulterated product bin.

In some embodiments, the equipment further comprises: a first detection channel and a second detection channel; wherein the first detection channel is used for re-inspecting the bulk material containing foreign objects, and the second detection channel is used for inspecting normal products under inspection; and the adulterated product bin comprises a first adulterated product bin and a second adulterated product bin, wherein the first adulterated product bin is configured corresponding to the first detection channel, and the second adulterated product bin is configured corresponding to the second detection channel, and the first adulterated product bin is used for collecting waste material when re-inspecting adulterated products, and the second adulterated product bin is used for collecting adulterated products removed during normal inspection.

In some embodiments, the second adulterated product bin is provided with a sensor for monitoring whether the bulk material containing foreign objects is full; when the bulk material containing foreign objects is full, the bulk material containing foreign objects is returned to the feed inlet via the flowback re-inspection mechanism for re-inspection.

In some embodiments, a transport speed of a flowback transport channel of the flowback re-inspection mechanism is smaller than a transport speed of the transport mechanism, so that spacing between the bulk material containing foreign objects to be re-inspected is increased, to satisfy a preset threshold of the blowing removal device.

In some embodiments, the flap removal device consists of a plurality of sub-flaps, each of which is configured to be independently used under control of a control and processing module.

Compared with the prior art, the present application has at least one of the following beneficial effects:

1. Compared with the traditional singular removal method, this application adopts two removal methods: flap removal+blowing removal. When the quantity of foreign objects is small, the blowing removal device can be used for accurate removal. When the quantity of foreign objects is large, to avoid missed removal due to blowing removals not quick enough, the flap removal device can be deployed. The removal methods can be flexibly selected based on the quantity of foreign objects, which improves the accuracy of foreign object removal and avoids removal failures.

2. In this application, when the quantity of foreign objects is small, the size and grayscale value of the foreign objects will be further identified. The denser the object, the more X-ray energy is absorbed, so the grayscale value is relatively higher during imaging. The greater the density, the heavier the corresponding weight of the object with a same size. Therefore, based on the proportional relationship between the grayscale value of the identified foreign objects and the density of the foreign objects, it can be preliminarily determined whether a foreign object has a high density. Two stages of grayscale values are preset in this application, and the density range of the foreign objects can be divided into three density ranges. If the grayscale value of a foreign object is greater than the second preset grayscale value, it means that the density of the foreign object exceeds a preset maximum value. This type of objects is generally difficult to blow out with a nozzle. So, to avoid removal failures, a flap is used for removal. If the grayscale value of a foreign object is greater than the first preset grayscale value and less than the second preset grayscale value, it means that the density of the foreign object is in the second interval. At this time, it is necessary to further determine in combination with the size of the foreign object whether it can be removed by blowing. If the foreign object is small, it can be removed by blowing. If the foreign object is large, considering the density of the foreign object in the second interval, the corresponding weight of the foreign object is also large, and it may be difficult to remove by blowing. Therefore, in this case, the flap will be used for removal. On the contrary, if the foreign object is small, it will be directly removed by blowing. If the grayscale value of the foreign object is less than the first preset grayscale value, it means that the density of the foreign object is small. Foreign objects with small density in the bulk material are generally relatively light in weight and can be accurately removed by blowing.

3. In the present application, when using gas blowing to remove foreign objects, if the distance between adjacent foreign objects is very close, it is very likely that the blowing removal device will not be quick enough to remove them. Therefore, to avoid removal failures, flap removal can be used when the distance between adjacent foreign objects is less than a preset distance.

4. The flap removal device in this application consists of several sub-flaps, such as two flaps or four flaps. Since the co-removal ratio of a flap is relatively high, to reduce the co-removal ratio of good products, we use a flap removal device comprising several sub-flaps. When the flap is needed to remove foreign objects, based on the distribution position of the foreign objects, the corresponding sub-flaps are activated to flip and remove the corresponding foreign objects, which greatly reduces the co-removal ratio.

BRIEF DESCRIPTION OF THE DRAWINGS

The preferred embodiments will be described below in a clear and understandable manner with reference to the accompanying drawings to further illustrate the above-mentioned characteristics, technical features, advantages and implementation methods of the present application.

DESCRIPTION OF THE ILLUSTRATED EMBODIMENTS

To more clearly illustrate the embodiments of the present application or the technical solutions in the prior art, the specific implementation methods of the present application will be described below with reference to the accompanying drawings. Obviously, the drawings described below are only some embodiments of the present application. For ordinary technical persons in this field, other drawings and other implementation methods can be obtained based on these drawings without creative effort.

To simplify the drawings, only parts related to the application are schematically shown in each figure, and they do not represent the actual structure of products. In addition, to simplify the drawings and facilitate understanding, in some figures, only one of the parts with the same structure or function is schematically drawn or marked. In this text, "one" not only means "only one", but may also mean "more than one".

Figure 1:
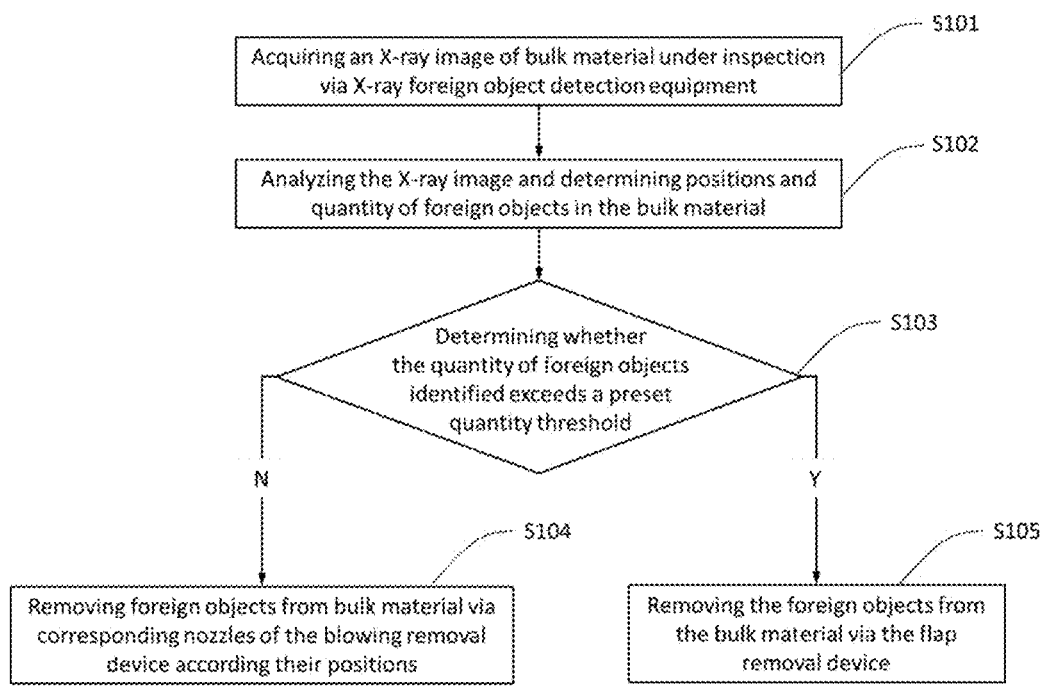
FIG. 1 is a flow chart of an embodiment of the bulk material foreign object detection method of the present application.

In one embodiment, referring to FIG. 1 of the specification, a bulk material foreign object detection method provided by the present application, which is applicable to an X-ray foreign object detection equipment, wherein the X-ray foreign object detection equipment is provided with a flap removal device and a blowing removal device. The bulk material foreign object detection method comprises:

S101, acquiring an X-ray image of the bulk material under inspection via the X-ray foreign object detection equipment. Specifically, the X-ray foreign object detection equipment uses X-rays to inspect and image objects under inspection in the inspection channel. Since different objects absorb X-ray energy differently, if foreign objects are mixed in the objects under inspection, the foreign objects and other objects absorb X-ray energy differently, and the imaged grayscale values corresponding to the foreign objects after imaging are also different. Therefore, generally, an X-ray image of the objects under inspection can be generated by inspecting the energy value of the X-rays passing through the objects to be inspected.

S102, analyzing the X-ray image and determining positions and quantity of foreign objects in the bulk material. Specifically, based on the X-ray image of the bulk material generated during inspection, image recognition and processing are performed to identify whether there are foreign objects in the bulk material under inspection. If there are foreign objects, the positions and quantity of the foreign objects can basically also be identified and determined.

S103, determining whether the quantity of foreign objects identified exceeds a preset quantity threshold;

S104, when it is determined that the quantity of the foreign object does not exceed the preset quantity threshold, based on the positions of the foreign objects, the foreign objects in the bulk material are removed by using one or more corresponding nozzles of the blowing removal device;

S105, when it is determined that the quantity of the foreign objects exceeds a preset quantity threshold, the foreign objects in the bulk material are removed by the flap removal device.

Generally, traditional bulk material removal processes deploy blowing removal technologies, but if the quantity of foreign objects to be removed is large, it is necessary to open multiple nozzles with very short intervals or at the same time to remove them. If more nozzles are opened, since multiple nozzles need to blow gas, the pressure of the blown gas may become low, resulting in a situation that foreign objects cannot be successfully removed. The solution of this embodiment can completely avoid this situation. Since the X-ray foreign object detection equipment in this application integrates two foreign object removal devices, i.e. the blowing removal device and the flap removal device, when inspecting the bulk material, a corresponding foreign object removal device can be used to remove the foreign objects according to the quantity and positions of the identified foreign objects. Specifically, if the quantity of identified foreign objects is large and exceeds the preset quantity threshold, the flap removal device is used to remove the foreign objects to avoid unsuccessful or missed foreign object removal. If the quantity of identified foreign objects is small and does not exceed the preset quantity threshold, the blowing removal device can be used to remove them. Specifically, one or more corresponding nozzles can be used to remove them according to the positions of the foreign objects, to achieve accurate removal of foreign objects.

Figure 2:
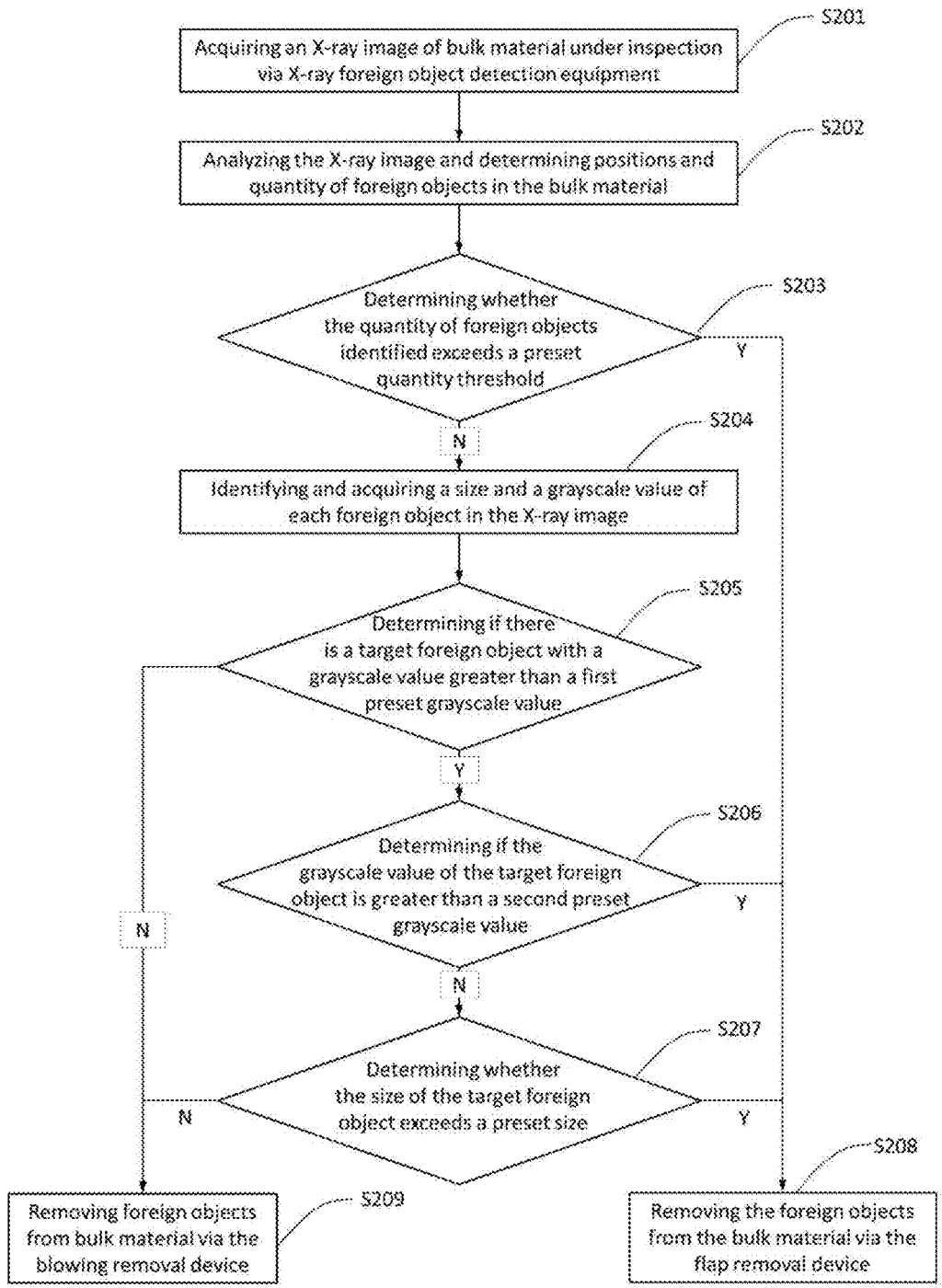
FIG. 2 is a flow chart of another embodiment of the bulk material foreign object detection method of the present application.

Another embodiment of the present application, as shown in FIG. 2, is based on the above embodiment. In the case where the quantity of foreign objects is small, blowing removal is not directly deployed. Instead, it is necessary to further determine whether there are foreign objects with high density and thus heavy weight among this small quantity of foreign objects, to avoid a situation where the blowing removal of the foreign objects fails due to their high density and heavy weight. Specifically, the bulk material foreign object detection method of this embodiment comprises:

S201, acquiring an X-ray image of the bulk material under inspection by the X-ray foreign object inspection equipment;

S202, analyzing the X-ray image to determine the positions and quantity of foreign objects in the bulk material;

S203, determining whether the quantity of the foreign objects identified exceeds a preset quantity threshold; if so, proceeding to step S208, otherwise proceeding to step S204;

S204, identifying and acquiring the size and grayscale value of each foreign object in the X-ray image;

S205, determining whether there exists a target foreign object with a grayscale value greater than a first preset grayscale value; if so, proceeding to step S206; otherwise, proceeding to step S209;

S206, determining whether the grayscale value of the target foreign object is greater than a second preset grayscale value; wherein the second preset grayscale value is greater than the first preset grayscale value; if so, proceeding to step S208; otherwise, proceeding to step S207;

S207, determining whether the size of the target foreign object exceeds a preset size; if so, proceeding to step S208; otherwise, proceeding to step S209;

S208, removing the foreign objects from the bulk material via the flap removal device;

S209, removing the target foreign object via the blowing removal device.

Compared with the previous embodiment, in the case of a small quantity of foreign objects, this embodiment adds a further judgment process based on the grayscale values (corresponding to densities) and size of the foreign objects to further determine the selection of a corresponding removal device. Since the grayscale value and the density are proportional when a foreign object is imaged, the density can be inferred by the grayscale value. For foreign objects with particularly high density, that is, foreign objects with grayscale values exceeding the second preset grayscale value, the flap can be directly used for removal. For foreign objects with grayscale values between the first preset grayscale value and the second preset grayscale value, the weight of the foreign object is further comprehensively judged in combination with the size of the foreign object. If the size exceeds the preset size, it also means that the foreign object is likely to be heavy and may not be removed by blowing, and then the flap is used for removal. If it does not exceed the preset size, a nozzle of the blowing device may surely remove it. For foreign objects with grayscale values lower than the first preset grayscale value, blowing can be directly used for removal. The first preset grayscale value, the second preset grayscale value and the preset size in this embodiment can all be configured based on the blowing force in the blowing removal process.

Specifically, let's take coffee bean inspection as an example. If a large screw falls into the coffee beans, the X-ray foreign object detection equipment is able to detect the screw foreign object, but due to the small quantity of foreign objects, if the blowing removal device is used directly, it will not be able to blow out and remove the foreign object. Therefore, in this case, we can use the above solution to comprehensively determine the selected removal method based on the density of the screw or the density and size. In other words, if such a dense foreign object or a heavy foreign object is encountered, then the flap is deployed to remove it.

Figure 3:
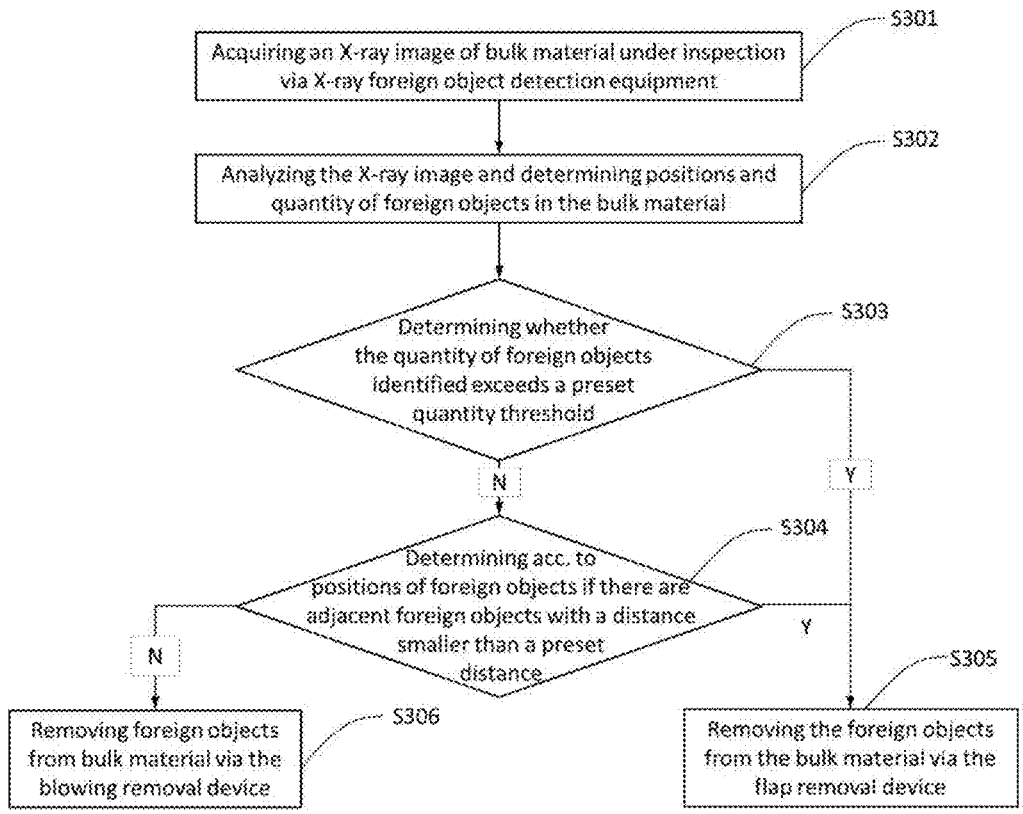
FIG. 3 is a flow chart of another embodiment of the bulk material foreign object detection method of the present application.

In another embodiment of the present application, as shown in FIG. 3, when the quantity of foreign objects does not exceed the preset quantity threshold, the positional distance of adjacent foreign objects will be further considered, and the removal method will be further determined based on the positional distance. Specifically, the bulk material foreign object detection method of this embodiment comprises:

S301, acquiring an X-ray image of the bulk material under inspection by the X-ray foreign object inspection equipment;

S302, analyzing the X-ray image to determine the positions and quantity of foreign objects in the bulk material;

S303, determining whether the quantity of the foreign objects identified exceeds a preset quantity threshold; if so, proceeding to step S305, otherwise proceeding to step S304;

S304, based on the positions of the foreign object, further determine whether there are adjacent foreign objects with a distance less than a preset distance; if so, proceed to step S305; otherwise, proceed to step S306;

S305, using the flap removal device to remove the foreign object;

S306, removing the foreign object via one or more corresponding nozzles of the blowing removal device.

Specifically, in this embodiment, when the quantity does not exceed the preset quantity threshold, it will be further determined based on the position of each foreign object whether there are adjacent foreign objects with a distance less than the preset distance. If so, when the nozzles are used to remove them, they may not be quick enough to remove them. Therefore, for adjacent foreign objects with a distance less than the preset distance, a flap will be used to avoid removal failures.

More preferably, based on the above embodiment, after further determining whether there are adjacent foreign objects with a distance less than a preset distance, determine whether the line connecting the positional coordinates of the adjacent foreign objects is perpendicular to the transmission direction of the inspection transmission channel. If so, the foreign objects are removed via the corresponding nozzles of the blowing removal device; otherwise, the foreign objects are removed via the flap removal device.

In some embodiments, the flap removal device consists of a plurality of sub-flaps, and each sub-flap can be used separately under the control of a foreign object removal module. The step "removing the foreign objects in the bulk material via the flap removal device" in any of the above embodiments specifically comprises: when it is determined that the quantity of the foreign objects exceeds a preset quantity threshold, determining one or more target sub-flaps for removing the foreign objects according to the positions of the foreign objects. When the foreign object reaches the removal zone of the transmission channel, the target sub-flaps are controlled to flip to remove the foreign objects.

Specifically, for example, two sub-flaps, three sub-flaps, or four sub-flaps are configured. Since a flap has a certain co-removal ratio, and if the flap consists of several sub-flaps, one or more target sub-flaps for removing the foreign objects can be selected based on the positions of the foreign objects, without the need to flip all the sub-flaps together. In this way, not only can the foreign objects be removed in a timely and accurate manner, but the co-removal ratio can also be greatly reduced.

Another embodiment of the present application, based on any of the above embodiments, further comprises the steps: monitoring whether an adulterated product bin corresponding to the flap removal device is full of bulk material containing foreign objects; and when it is monitored that the adulterated product bin is full of bulk material containing foreign objects, sending out an alarm or returning the bulk material containing foreign objects to a feed bin via a flowback transport channel according to a received flowback re-inspection instruction, and controlling the output flow of the bulk material containing foreign objects in the feed bin to the transmission channel, so that the X-ray foreign object detection equipment can re-inspect the bulk material containing foreign objects.

In the flap removal operation, there is a certain co-removal ratio, especially if the flap is not composed of sub-flaps, the co-removal ratio may be relatively high. When removing defective products, some good products will be removed together. Therefore, an adulterated product material flowback re-inspection function is added to address this shortcoming. After receiving a user's flowback inspection instruction, the bulk material containing foreign objects in the adulterated product bin corresponding to the flap removal device will be returned to the transport channel for re-inspection. Because the products to be re-inspected contain a large quantity of defective products, the speed of the flowback conveyor will be relatively slow, so that the products under inspection are kept as far apart as possible, and a hoister can also enlarge the distance between the products, so that during the re-inspection, blowing removal can be used as much as possible to reduce the co-removal ratio. Of course, when the adulterated product bin is full of bulk materials containing foreign objects (for example, a photoelectric switch is used to monitor whether the adulterated product bin is full of bulk material containing foreign objects), an alarm can be promptly sent out to let the user know and deal with the situation in time.

Figure 4:
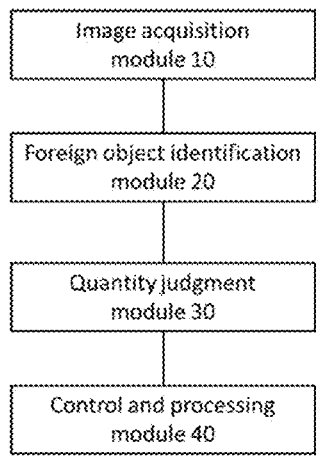
FIG. 4 is a structural block diagram of an embodiment of the bulk material foreign object detection device of the present application.

Based on the same technical concept, the present application discloses a bulk material foreign object detection device, which is integrated into an X-ray foreign object detection equipment, and the X-ray foreign object detection equipment is provided with a flap removal device and a blowing removal device. As shown in FIG. 4, the bulk material foreign object detection device comprises: an image acquisition module 10, used to acquire an X-ray image of the bulk material under inspection via the X-ray foreign object detection equipment; a foreign object identification module 20, used to analyze the X-ray image to determine the positions and the quantity of foreign objects in the bulk material; a quantity judgment module 30, used to determine whether the quantity of identified foreign objects exceeds a preset quantity threshold; a control and processing module 40, used to remove the foreign objects in the bulk material via the flap removal device when it is determined that the quantity of the foreign objects exceeds the preset quantity threshold; and when it is determined that the quantity of the foreign objects does not exceed the preset quantity threshold, based on the positions of the foreign objects, the foreign objects in the bulk material are removed via one or more corresponding nozzles of the blowing removal device.

Specifically, compared with the traditional singular removal method, this application adopts two removal methods: flap removal+blowing removal. When the quantity of foreign objects is small, the blowing removal device can be used for accurate removal. When the quantity of the foreign objects is large, to avoid removal failures due to blowing removal being not fast-responding enough, the flap removal device can be used for removal. The removal methods can be flexibly selected based on the quantity of foreign objects, which improves the accuracy of foreign object removal and avoids removal failures.

Figure 5:
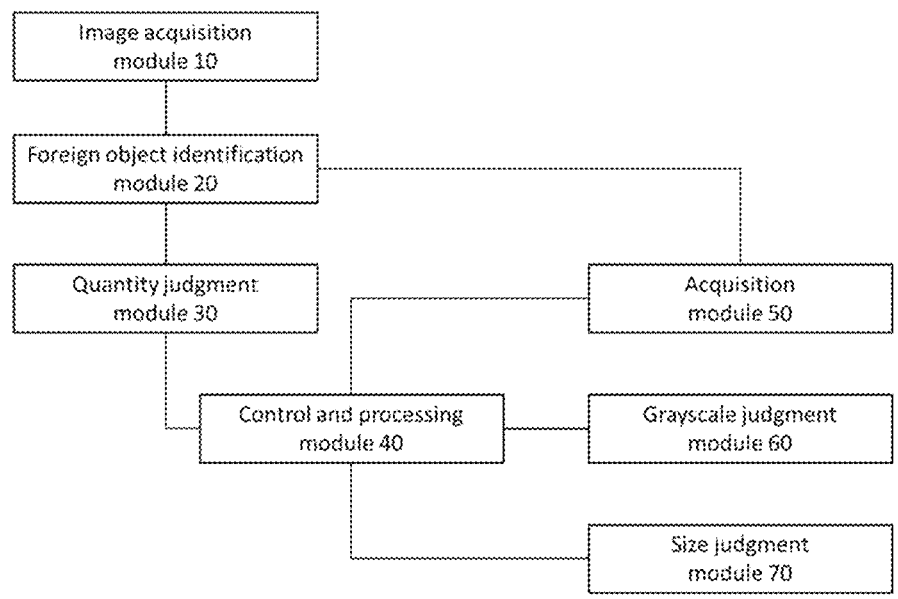
FIG. 5 is a structural block diagram of another embodiment of the bulk material foreign object detection device of the present application.
Figure 6:
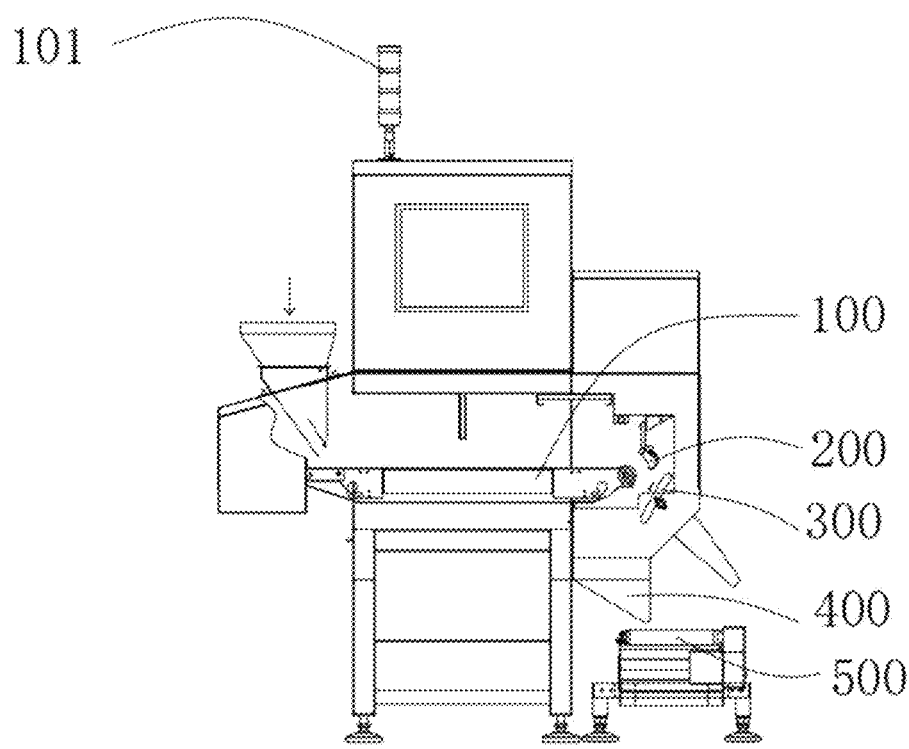
FIG. 6 is a front view of an embodiment of the X-ray foreign object detection equipment of the present application.
Figure 7:
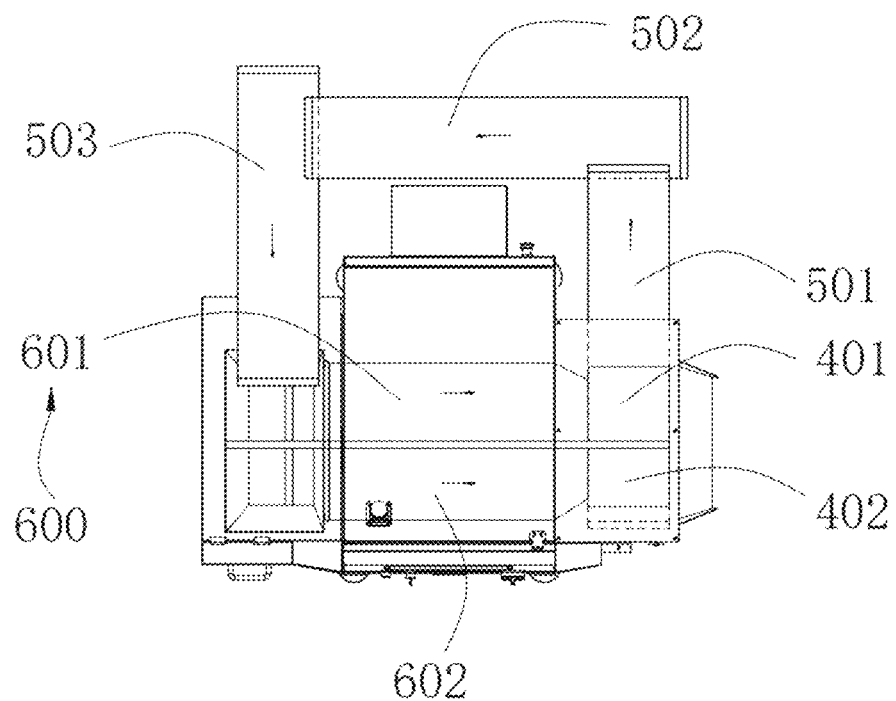
FIG. 7 is a top view of an embodiment of the X-ray foreign object detection equipment of the present application.
Figure 8:
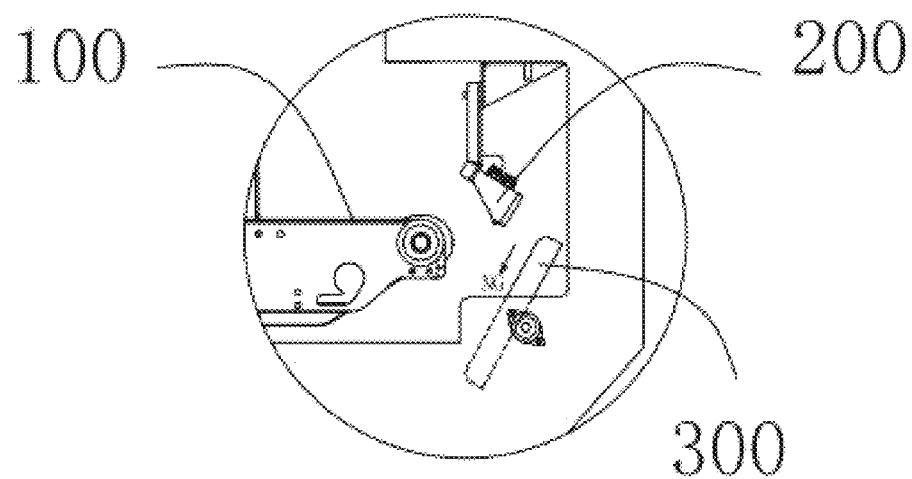
FIG. 8 is a schematic structural diagram of the discharge port of the X-ray foreign object detection equipment of an embodiment of the present application, in a working state of flap removal.
Figure 9:
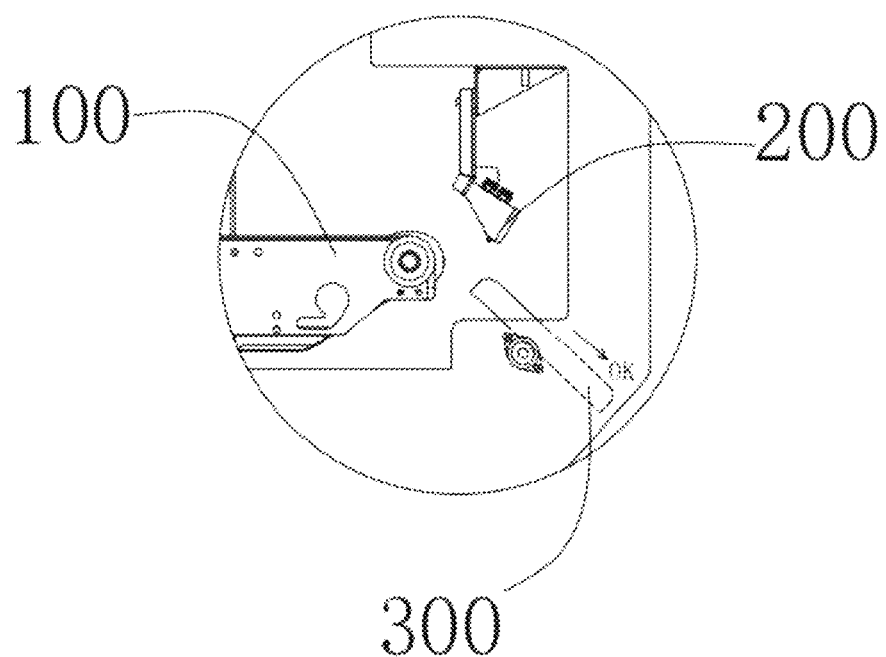
FIG. 9 is a schematic structural diagram of the discharge port of the X-ray foreign object detection equipment of an embodiment of the present application, in a working state of collecting normal products.
Figure 10:
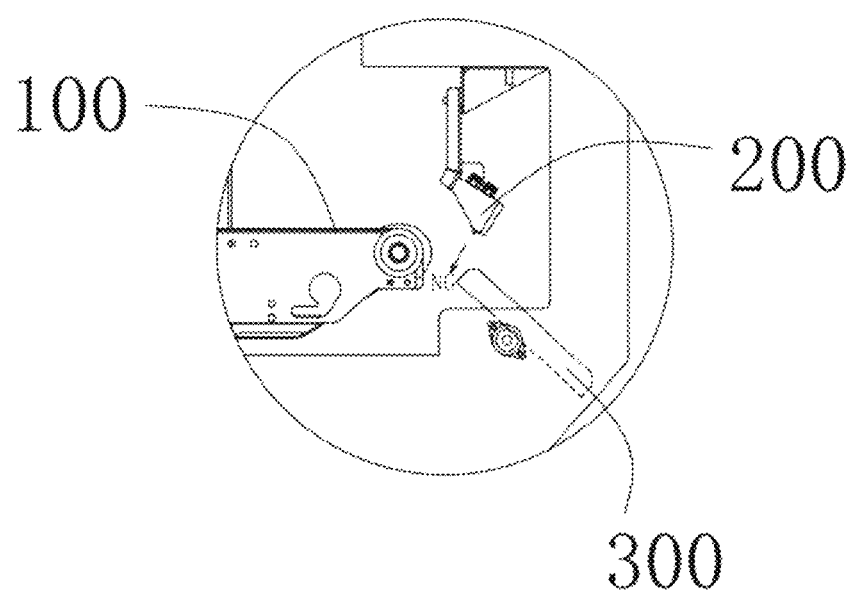
FIG. 10 is a schematic structural diagram of the discharge port of the X-ray foreign object detection equipment of an embodiment of the present application, in a working state of blowing removal.

Another embodiment of the bulk material foreign object detection device of the present application, based on the above embodiment, as shown in FIG. 5, further comprises: an acquisition module 50, used to identify and acquire the size and the grayscale value of each foreign object in the X-ray image; a grayscale judgment module 60, used to determine whether there is a target foreign object with a grayscale value greater than a first preset grayscale value, and wherein, when a target foreign object exists, determine whether the grayscale value of the target foreign object is greater than a second preset grayscale value, and wherein the second preset grayscale value is greater than the first preset grayscale value, and the control and processing module 40 is also used to remove the target foreign object via the flap removal device when the grayscale value of the target foreign object is greater than the second preset grayscale value; and a size judgment module 70, used to determine whether the size of the target foreign object exceeds a preset size when the grayscale value of the target foreign object is not greater than the second preset grayscale value, wherein the control and processing module 40 is also used to removal the target foreign object via the flap removal device when it is determined that the size of the target foreign object exceeds the preset size, and wherein, when it is determined that the size of the target foreign object does not exceed the preset size, remove the target foreign object via the air blowing removal device.

In this embodiment, not only the quantity of foreign objects is considered, but on the basis of the quantity of foreign objects, the density of the foreign objects (because the density is proportional to the grayscale value, it can be determined based on the grayscale value) and the size of the foreign objects (which can be determined by the pixel amount of the foreign objects in the X-ray image) are further analyzed to comprehensively determine the selection of the removal devices, thereby avoiding the situation where dense and heavy objects cannot be removed by blowing removal and are missed, thereby improving the accuracy of foreign object removal.

On the basis of any of the above embodiments, the bulk material foreign object detection device also comprises: a position judgment module, used to further determine whether there are adjacent foreign objects with a distance less than a preset distance based on the positions of the foreign objects after the quantity judgment module determines that the quantity of the foreign objects identified does not exceed the preset quantity threshold, wherein the control and processing module is also used to deploy the flap removal device to remove the foreign objects when it is determined that there are adjacent foreign objects with a distance less than the preset distance; and when it is determined that there are no adjacent foreign objects with a distance less than the preset distance, remove the foreign objects via one or more corresponding nozzles of the blowing removal device; and the position judgment module is also used to determine one or more target sub-flips in the flap removal device for removing the foreign objects based on the positions of the foreign objects when the flap removal device is to be used to remove the foreign objects, and to control the target sub-flips of the flap removal device to flip to remove the foreign objects.

In this embodiment, the flap removal device consists of several sub-flaps, such as two sub-flaps or four sub-flaps. Since the co-removal ratio of a flap is relatively high, to reduce the co-removal ratio of good products, we use a flap removal device comprising several sub-flaps. When the flap is needed to remove foreign objects, based on the distribution positions of the foreign objects, the corresponding sub-flaps are activated to flip and remove the corresponding foreign objects, which can greatly reduce the co-removal ratio.

Finally, the present application also discloses an X-ray foreign object detection equipment, comprising: the bulk material foreign object detection device described in any of the above device embodiments. The device embodiments or equipment embodiments of the present application corresponds to the method embodiments of the present application, and the technical details of the method embodiments of the present application are also applicable to the device embodiments of the present application. For specific effects, please refer to the above method embodiments, which will not be repeated here.

In one embodiment of the X-ray foreign object detection equipment, as shown in FIGS. 6-10, it comprises a transport mechanism 100, a bulk material foreign object detection device 600, a blowing removal device 200, and a flap removal device 300. The transport mechanism 100 is used to transport products under inspection, so that the products under inspection passes through the bulk material foreign object detection device 600 for abnormality detection. In this embodiment, the transport mechanism 100 is a looping conveyor belt, and the products under inspection are placed onto the conveyor belt in sequence. The bulk material foreign object detection device 600 is arranged on the conveyor belt to form a detection channel, and the conveyor belt passes through the detection channel. In this embodiment, the bulk material foreign object detection device 600 is an X-ray detection mechanism, which detects the internal structure and morphology of the products via X-ray transmission images, to find the defects or foreign objects in the products, and to collect data. When the foreign objects or adulterated products are transported to a discharge port of the transport mechanism 100, the blowing removal device 200 and the flap removal device 300 are controlled by a control system to enter working states. The blowing removal device 200 is arranged at the discharge port of the transport mechanism 100, and the opening and closing of the blowing removal device 200 is controlled by the data collected by the bulk material foreign object detection device 600, to perform gas blowing screening on the products under inspection. The flap removal device 300 is rotatably arranged at the discharge port of the transport mechanism 100. When the products are good products, the flap removal device 300 is stationary, and the good products naturally slides from the discharge port of the transport mechanism 100 to the flap removal device 300 and enters the good product bin; when the products are adulterated products, and the quantity of adulterated products is large, the flap of the flap removal device 300 rotates a certain angle to block and intercept the adulterated products, and the adulterated products are collected into the adulterated product bin 400 via the flap.

In this embodiment, the flap removal device 300 and the blowing removal device 200 are combined for screening. When the quantity of adulterated products is small, the blowing removal device 200 is used for gas blowing screening. When the quantity of adulterated products is large, the flap removal device 300 rotates a certain angle to prevent the adulterated products from sliding into the good product bin, and collects the adulterated products into the adulterated product bin 400. Since the gas blown from the nozzles of the blowing removal device 200 is a high-pressure gas to change the motion trajectory of the products, and the nozzles of the blowing removal device 200 are a plurality of side-by-side structures, when the quantity is large, the gas pressure of the blown gas will be reduced, and the motion trajectory of the products may not be changed. In actual operation, a critical gas pressure threshold is preset according to the capacity of the air compressor. When foreign objects are detected, the nozzles that need to be opened will be further confirmed. If the number is less than a preset threshold, the blowing removal device 200 will be used to remove the foreign objects. When the number of nozzles that need to be opened is greater than or equal to the preset threshold, the flap removal device 300 will be used for removal to reduce the co-removal ratio of good products.

In one embodiment, the transport mechanism 100 is a conveyor belt, which passes through the bulk material foreign object detection device 600. The discharge port of the conveyor belt is provided with a blowing removal device 200 with multiple nozzles, and the total width of the combined multiple nozzles is adapted to the width of the conveyor belt. Specifically, since the products under inspection scattered on the conveyor belt will be distributed and separated on the conveyor belt, by configuring multiple nozzles, accurate blowing removal is achieved, which does not affect the sliding of good products from the flap removal device 300, and reduces the proportion of good products co-removed. It can be understood that the quantity of nozzles is not limited by the present application, but since the capacity of the air compressor is constant and the air pressure is constant, in order to use the blowing removal device 200 for removal as much as possible, it is adjusted according to the capacity of the air compressor, the quantity of nozzles is maximized, and the proportion of good products co-removed when the flap removal device 300 operates is reduced, achieving accurate removal.

In one embodiment, the flap width of the flap removal device 300 is adapted to the width of the conveyor belt, to ensure that the adulterated products on the transport mechanism 100 can be removed by the flap to prevent them from sliding into the good product bin. The flap has a first end and a second end, and the installation height of the first end is lower than the height of the conveyor belt, so that the products on the transport mechanism 100 can slide freely. A certain gap is provided between the first end of the flap and the transport mechanism 100, so that when the air blowing removal device 200 is working, the adulterated products can fall through the gap to the adulterated product bin 400. In a specific implementation, the gap is adjusted according to the size of the products. Further, to ensure that the flap removal device 300 can achieve accurate removal when operating, the flap can comprise multiple sub-flaps, which are selected according to the size of the products in actual practices. When the products are large, a single flap can be used, and when the products are small, a multi-flap structure can be used.

In one embodiment, the intelligent removal device further comprises an adulterated product bin 400 and a good product bin located at the discharge port of the transport mechanism 100, wherein the adulterated product bin 400 is arranged on a side close to the transport mechanism 100, and the good product bin is arranged on the side away from the transport mechanism 100. By providing the adulterated product bin 400 and the good product bin, the good products and adulterated products are separated, collected and processed to avoid mixing. Further, the adulterated product bin 400 is divided into a first adulterated product bin 401 and a second adulterated product bin 402, the first adulterated product bin 401 is used for the collection of waste material in the re-inspection, and the second adulterated product bin 402 is used for the collection of adulterated products removed in normal inspection.

In one embodiment, the intelligent removal device also comprises an adulterated product flowback re-inspection mechanism 500, which is connected to the second adulterated product bin 402 and a feed port of the transport mechanism 100, and is used to re-inspect and screen the adulterated products in the second adulterated product bin 402. Since good products will be co-removed when the flap removal device 300 is working, it is necessary to conduct a secondary inspection and screening of the good products mixed in the adulterated products. Furthermore, the adulterated product flowback re-inspection mechanism 500 comprises a first conveyor 501, a second conveyor 502 and a hoister 503, wherein one end of the first conveyor 501 is arranged at the bottom of a discharge port of the second adulterated product bin 402, one end of the hoister 503 is arranged at the feed port of the transport mechanism 100, and the second conveyor 502 is used to connect the first conveyor 501 and the hoister 503. By providing the first conveyor 501, the second conveyor 502 and the hoister 503, the adulterated products in the second adulterated product bin 402 are transported to the feed port of the bulk material foreign object detection device 600 for secondary screening and removal, and the good products in the adulterated products are screened out to avoid waste. In this embodiment, the first conveyor 501, the second conveyor 502 and the hoister 503 are all conveyor belt structures. Optionally, the conveyor belt structure can also be a ring chain structure.

In one embodiment, since some products need to be inspected twice, to ensure the inspection of normal products under inspection, a first baffle is provided on the bulk material foreign object detection device 600, and the bulk material foreign object detection device 600 is divided into a first detection channel 601 and a second detection channel 602. The first detection channel 601 is used for re-inspection of adulterated products, and one end of which corresponds to the first adulterated product bin 401. The second detection channel 602 is used for inspection of normal products under inspection, and one end of which corresponds to the second adulterated product bin 402. One end of the hoister 503 is configured at the feed inlet above the first detection channel 601, and the first baffle extends to the feed inlet of the bulk material foreign object detection device 600. By providing the first baffle, a first inspection process of normal products and a second inspection process of adulterated products are distinguished to avoid feed mixing. Optionally, the first detection channel 601 and the second detection channel 602 can also be two independent conveyor belt structures.

In one embodiment, a sensor is provided at the entrance of the second adulterated product bin 402. By providing the sensor, it is monitored in real time whether the second adulterated product bin 402 is full of adulterated products. When the second adulterated product bin 402 is full of products, the discharge port provided at the bottom of the second adulterated product bin 402 is opened, and the adulterated products are conveyed to the first conveyor 501 for secondary flowback detection. Furthermore, to ensure that an operator can notice the situation in time, an alarm light 101 is provided on the housing of the intelligent removal device. Optionally, the discharge port of the second adulterated product bin 402 can be an automated structure.

In one embodiment, since there are a large number of foreign objects in the secondary inspection, in order to use the blowing removal device 200 to remove them as much as possible, the speed of the first conveyor 501, the second conveyor 502 and the hoister 503 is slower than the speed of the conveyor belt of the transport mechanism 100, so that the spacing between the adulterated products under re-inspection is enlarged to meet the gas pressure threshold of the air compressor adjusted according to the blowing removal device 200 to remove foreign objects.

In the above embodiments, the description of each embodiment has its own emphasis. For parts that are not described or recorded in detail in a certain embodiment, please refer to the relevant description of other embodiments. The above embodiments can be freely combined as needed. The above are only preferred implementations of the present application. For ordinary technicians in this technical field, several improvements and modifications can be made without departing from the principles of the present application. These improvements and modifications should also be regarded as the scope of protection of the present application.

The invention claimed is:

1. A bulk material foreign object detection method, characterized by
being applicable to an X-ray foreign object detection equipment provided with a flap removal device and a blowing removal device, and comprising:
acquiring an X-ray image of bulk material under inspection via the X-ray foreign object detection equipment;
analyzing the X-ray image to determine positions and a quantity of foreign objects in the bulk material;
determining whether the quantity of foreign objects identified exceeds a preset quantity threshold;
removing the foreign objects from the bulk material via the flap removal device when the quantity of the foreign objects exceeds the preset quantity threshold;
removing the foreign objects from the bulk material via one or more corresponding nozzles of the blowing removal device according to the positions of the foreign objects when the quantity of the foreign objects does not exceed the preset quantity threshold.

2. The bulk material foreign object detection method according to claim 1, characterized in that,
said removing the foreign objects from the bulk material via one or more corresponding nozzles of the blowing removal device according to the positions of the foreign objects when the quantity of the foreign objects does not exceed the preset quantity threshold specifically comprises:
identifying and acquiring a size and a grayscale value of each foreign object in the X-ray image;
determining whether there exists a target foreign object with a grayscale value greater than a first preset grayscale value;
when the target foreign object exists, determining whether the grayscale value of the target foreign object is greater than a second preset grayscale value; wherein the second preset grayscale value is greater than the first preset grayscale value;
when the grayscale value of the target foreign object is greater than the second preset grayscale value, removing the target foreign object via the flap removal device;
when the grayscale value of the target foreign object is not greater than the second preset grayscale value, determining whether the size of the target foreign object exceeds a preset size;
when the size of the target foreign object exceeds the preset size, removing the target foreign object via the flap removal device;
when the size of the first target foreign object does not exceed the preset size, removing the target foreign object via the blowing removal device.

3. The bulk material foreign object detection method according to claim 2, characterized by further comprising,
monitoring whether an adulterated product bin is filled with bulk material containing foreign objects;
when the adulterated product bin is filled with bulk material containing foreign objects, returning the bulk material containing foreign objects to a feed inlet via a flowback transport channel, so that the X-ray foreign object detection equipment re-inspects the bulk material containing foreign objects.

4. The bulk material foreign object detection method according to claim 1, characterized in that,
said removing the foreign objects from the bulk material via one or more corresponding nozzles of the blowing removal device according to the positions of the foreign objects when the quantity of the foreign objects does not exceed the preset quantity threshold specifically comprises:
when the quantity of the foreign objects does not exceed the preset quantity threshold, further determining according to the positions of the foreign objects whether there are adjacent foreign objects with a distance smaller than a preset distance;
when there are adjacent foreign objects with a distance smaller than the preset distance, removing the foreign objects via the flap removal device;
when there are no adjacent foreign objects with a distance smaller than the preset distance, removing the foreign objects via one or more corresponding nozzles of the blowing removal device.

5. The bulk material foreign object detection method according to claim 1, characterized in that,
the flap removal device consists of a plurality of sub-flaps, each of which is configured to be independently used under control of a control and processing module; and
said removing the foreign objects from the bulk material via the flap removal device when the quantity of the foreign objects exceeds the preset quantity threshold specifically comprises:
when the quantity of the foreign objects exceeds the preset quantity threshold, determining a target sub-flap to be used for removing the foreign objects according to the positions of the foreign objects;
when a foreign object reaches a removal zone of a transport channel, controlling the target sub-flap to flip, to remove the foreign object.

6. The bulk material foreign object detection method according to claim 1, characterized by further comprising:
monitoring whether an adulterated product bin is filled with bulk material containing foreign objects;
when the adulterated product bin is filled with bulk material containing foreign objects, returning the bulk material containing foreign objects to a feed inlet via a flowback transport channel, so that the X-ray foreign object detection equipment re-inspects the bulk material containing foreign objects.

7. The bulk material foreign object detection method according to claim 6, characterized in that,
a transport speed of the flowback transport channel is smaller than a transport speed of a transport mechanism of the X-ray foreign object detection equipment, so that spacing between the bulk material containing foreign objects to be re-inspected is increased, to satisfy a preset threshold of the blowing removal device.

8. The bulk material foreign object detection method according to claim 7, characterized in that,
said removing the foreign objects from the bulk material via one or more corresponding nozzles of the blowing removal device according to the positions of the foreign objects when the quantity of the foreign objects does not exceed the preset quantity threshold specifically comprises:
identifying and acquiring a size and a grayscale value of each foreign object in the X-ray image;
determining whether there exists a target foreign object with a grayscale value greater than a first preset grayscale value;
when the target foreign object exists, determining whether the grayscale value of the target foreign object is greater than a second preset grayscale value; wherein the second preset grayscale value is greater than the first preset grayscale value;
when the grayscale value of the target foreign object is greater than the second preset grayscale value, removing the target foreign object via the flap removal device;
when the grayscale value of the target foreign object is not greater than the second preset grayscale value, determining whether the size of the target foreign object exceeds a preset size;
when the size of the target foreign object exceeds the preset size, removing the target foreign object via the flap removal device;
when the size of the target foreign object does not exceed the preset size, removing the target foreign object via the blowing removal device.

9. The bulk material foreign object detection method according to claim 7, characterized in that,
said removing the foreign objects from the bulk material via one or more corresponding nozzles of the blowing removal device according to the positions of the foreign objects when the quantity of the foreign objects does not exceed the preset quantity threshold specifically comprises:
when the quantity of the foreign objects does not exceed the preset quantity threshold, further determining according to the positions of the foreign objects whether there are adjacent foreign objects with a distance smaller than a preset distance;
when there are adjacent foreign objects with a distance smaller than the preset distance, removing the foreign objects via the flap removal device;
when there are no adjacent foreign objects with a distance smaller than the preset distance, removing the foreign objects via one or more corresponding nozzles of the blowing removal device.

10. The bulk material foreign object detection method according to claim 7, characterized in that,
the flap removal device consists of a plurality of sub-flaps, each of which is configured to be independently used under control of a control and processing module; and
said removing the foreign objects from the bulk material via the flap removal device when the quantity of the foreign objects exceeds the preset quantity threshold specifically comprises:
when the quantity of the foreign objects exceeds the preset quantity threshold, determining a target sub-flap to be used for removing the foreign objects according to the positions of the foreign objects;
when a foreign object reaches a removal zone of a transport channel, controlling the target sub-flap to flip, to remove the foreign object.

11. A bulk material foreign object detection device, characterized by
being integrated into an X-ray foreign object detection equipment provided with a flap removal device and a blowing removal device, and comprising:
an image acquisition module for acquiring an X-ray image of bulk material under inspection via the X-ray foreign object detection equipment;
a foreign object identification module for analyzing the X-ray image to determine positions and a quantity of foreign objects in the bulk material;
a quantity judgment module for determining whether the quantity of foreign objects identified exceeds a preset quantity threshold;
a control and processing module for removing the foreign objects from the bulk material via the flap removal device when the quantity of the foreign objects exceeds the preset quantity threshold, and for removing the foreign objects from the bulk material via one or more corresponding nozzles of the blowing removal device according to the positions of the foreign objects when the quantity of the foreign objects does not exceed the preset quantity threshold.

12. The bulk material foreign object detection device according to claim 11, characterized by further comprising:
an acquisition module for identifying a size and a grayscale value of each foreign object in the X-ray image;
a grayscale judgment module for determining whether there exists a target foreign object with a grayscale value greater than a first preset grayscale value; and, when the target foreign object exists, determining whether the grayscale value of the target foreign object is greater than a second preset grayscale value, wherein the second preset grayscale value is greater than the first preset grayscale value; and wherein, the control and processing module is also used to remove the target foreign object via the flap removal device when the grayscale value of the target foreign object is greater than the second preset grayscale value;
a size judgment module for determining whether the size of the target foreign object exceeds a preset size when the grayscale value of the target foreign object is not greater than the second preset grayscale value; wherein the control and processing module is also used to remove the target foreign object via the flap removal device when the size of the target foreign object exceeds the preset size; and when the size does not exceed the preset size, the target foreign object is removed via the blowing removal device.

13. The bulk material foreign object detection device according to claim 11, characterized by further comprising:
a position judgment module for further determining whether there are adjacent foreign objects with a distance smaller than a preset distance according to the positions of the foreign objects after the quantity judgment module determines that the quantity of identified foreign objects does not exceed the preset quantity threshold;
wherein the control and processing module is also used to remove the foreign objects via the flap removal device when adjacent foreign objects with a distance smaller than the preset distance exist; and when no adjacent foreign objects with a distance smaller than the preset distance exist, the foreign objects are removed via one or more corresponding nozzles of the blowing removal device;

and the position judgment module is also used to determine a target sub-flap for removing the foreign objects when the foreign objects are to be removed via the flap removal device, and to control the target sub-flap to flip to remove the foreign objects.

14. An X-ray foreign object detection equipment, characterized by comprising:
the bulk material foreign object detection device according to claim 11, a transport mechanism, a flap removal device, and a blowing removal device;
wherein the transport mechanism is used to transport products under inspection; and the bulk material foreign object detection device is configured on the transport mechanism to inspect the products under inspection on the transport mechanism.

15. The X-ray foreign object detection equipment according to claim 14, characterized by further comprising:
an adulterated product bin and an adulterated product flowback re-inspection mechanism;
wherein the adulterated product flowback re-inspection mechanism is connected to the adulterated product bin and a feed inlet of the transport mechanism, and is used to re-inspect bulk material containing foreign objects in the adulterated product bin.

16. The X-ray foreign object detection equipment according to claim 15, characterized in that,
a transport speed of a flowback transport channel of the flowback re-inspection mechanism is smaller than a transport speed of the transport mechanism, so that spacing between the bulk material containing foreign objects to be re-inspected is increased, to satisfy a preset threshold of the blowing removal device.

17. The X-ray foreign object detection equipment according to claim 16, characterized in that,
the flap removal device consists of a plurality of sub-flaps, each of which is configured to be independently used under control of a control and processing module.

18. The X-ray foreign object detection equipment according to claim 14, characterized in that,
the flap removal device consists of a plurality of sub-flaps, each of which is configured to be independently used under control of a control and processing module.

19. The X-ray foreign object detection equipment according to claim 14, characterized in that,
the bulk material foreign object detection device further comprising:
an acquisition module for identifying a size and a grayscale value of each foreign object in the X-ray image;
a grayscale judgment module for determining whether there exists a target foreign object with a grayscale value greater than a first preset grayscale value; and, when the target foreign object exists, determining whether the grayscale value of the target foreign object is greater than a second preset grayscale value, wherein the second preset grayscale value is greater than the first preset grayscale value; and wherein, the control and processing module is also used to remove the target foreign object via the flap removal device when the grayscale value of the target foreign object is greater than the second preset grayscale value;
a size judgment module for determining whether the size of the target foreign object exceeds a preset size when the grayscale value of the target foreign object is not greater than the second preset grayscale value; wherein the control and processing module is also used to remove the target foreign object via the flap removal device when the size of the target foreign object exceeds the preset size; and when the size does not exceed the preset size, the target foreign object is removed via the blowing removal device.

20. The X-ray foreign object detection equipment according to claim 14, characterized in that,
the bulk material foreign object detection device further comprising:
a position judgment module for further determining whether there are adjacent foreign objects with a distance smaller than a preset distance according to the positions of the foreign objects after the quantity judgment module determines that the quantity of identified foreign objects does not exceed the preset quantity threshold;
wherein the control and processing module is also used to remove the foreign objects via the flap removal device when adjacent foreign objects with a distance smaller than the preset distance exist; and when no adjacent foreign objects with a distance smaller than the preset distance exist, the foreign objects are removed via one or more corresponding nozzles of the blowing removal device;
and the position judgment module is also used to determine a target sub-flap for removing the foreign objects when the foreign objects are to be removed via the flap removal device, and to control the target sub-flap to flip to remove the foreign objects.

* * * * *